Dec. 17, 1957  R. W. WILSON  2,816,411
TOBACCO PRIMING DEVICE
Filed July 21, 1954  3 Sheets-Sheet 1
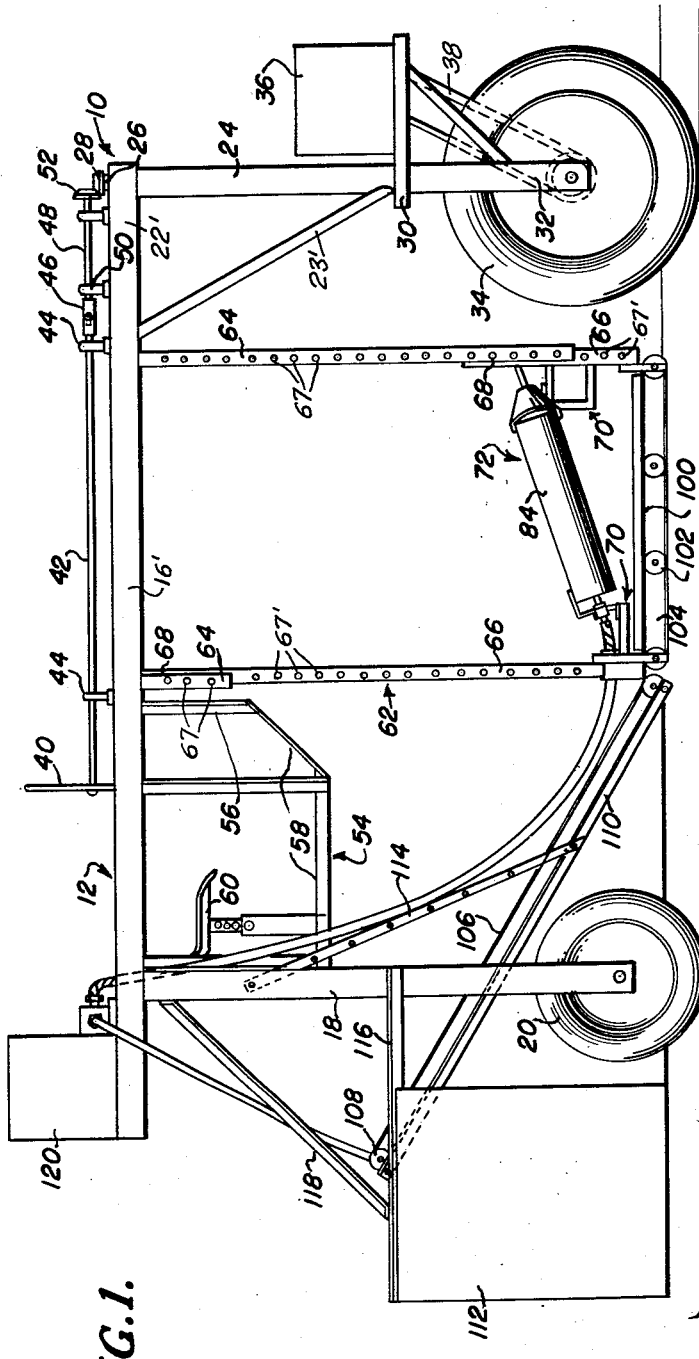
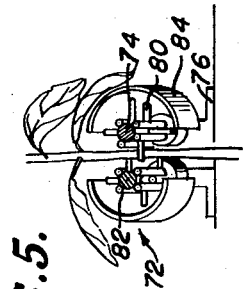
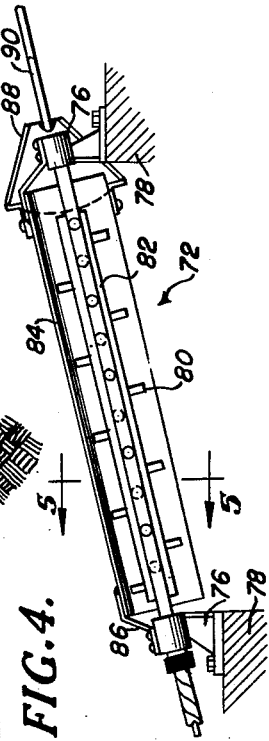
INVENTOR
Robert W. Wilson
BY Cushman, Darby & Cushman
ATTORNEYS

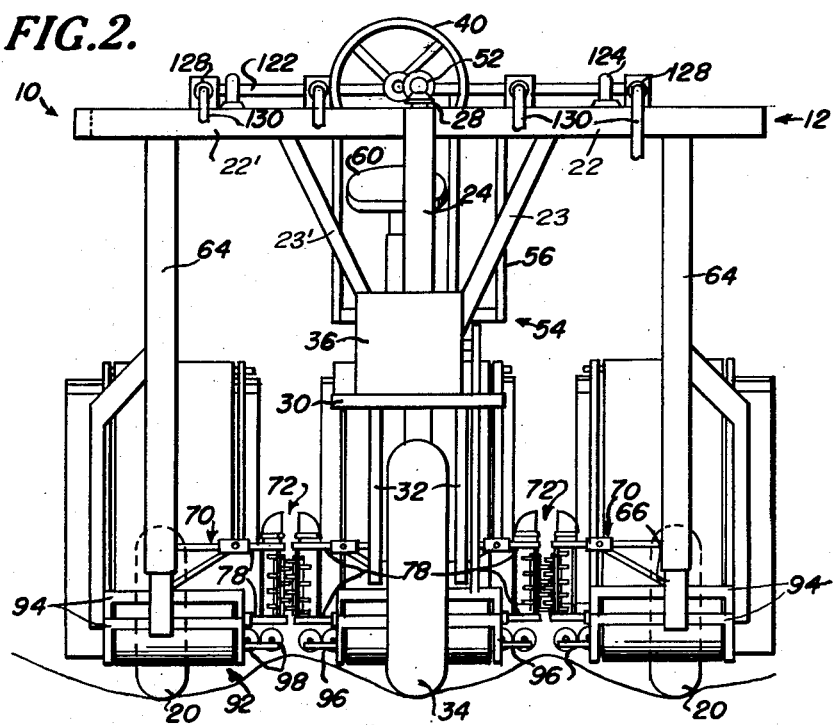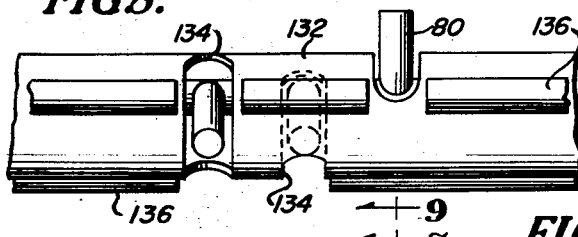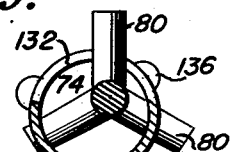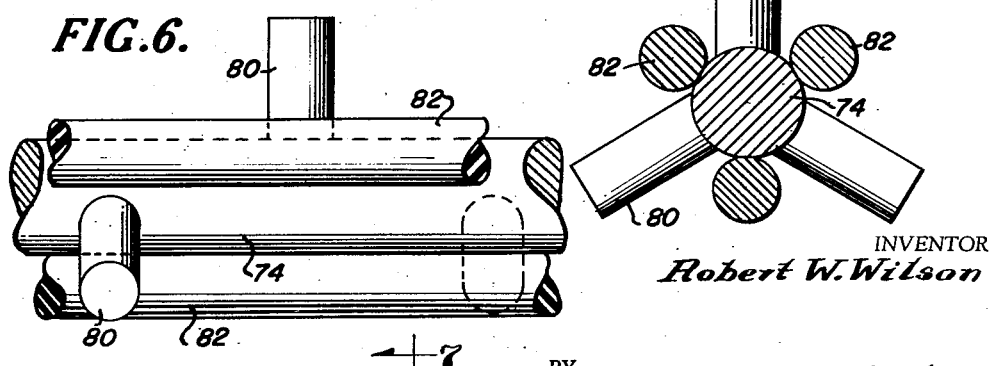

Dec. 17, 1957  R. W. WILSON  2,816,411
TOBACCO PRIMING DEVICE
Filed July 21, 1954  3 Sheets-Sheet 3
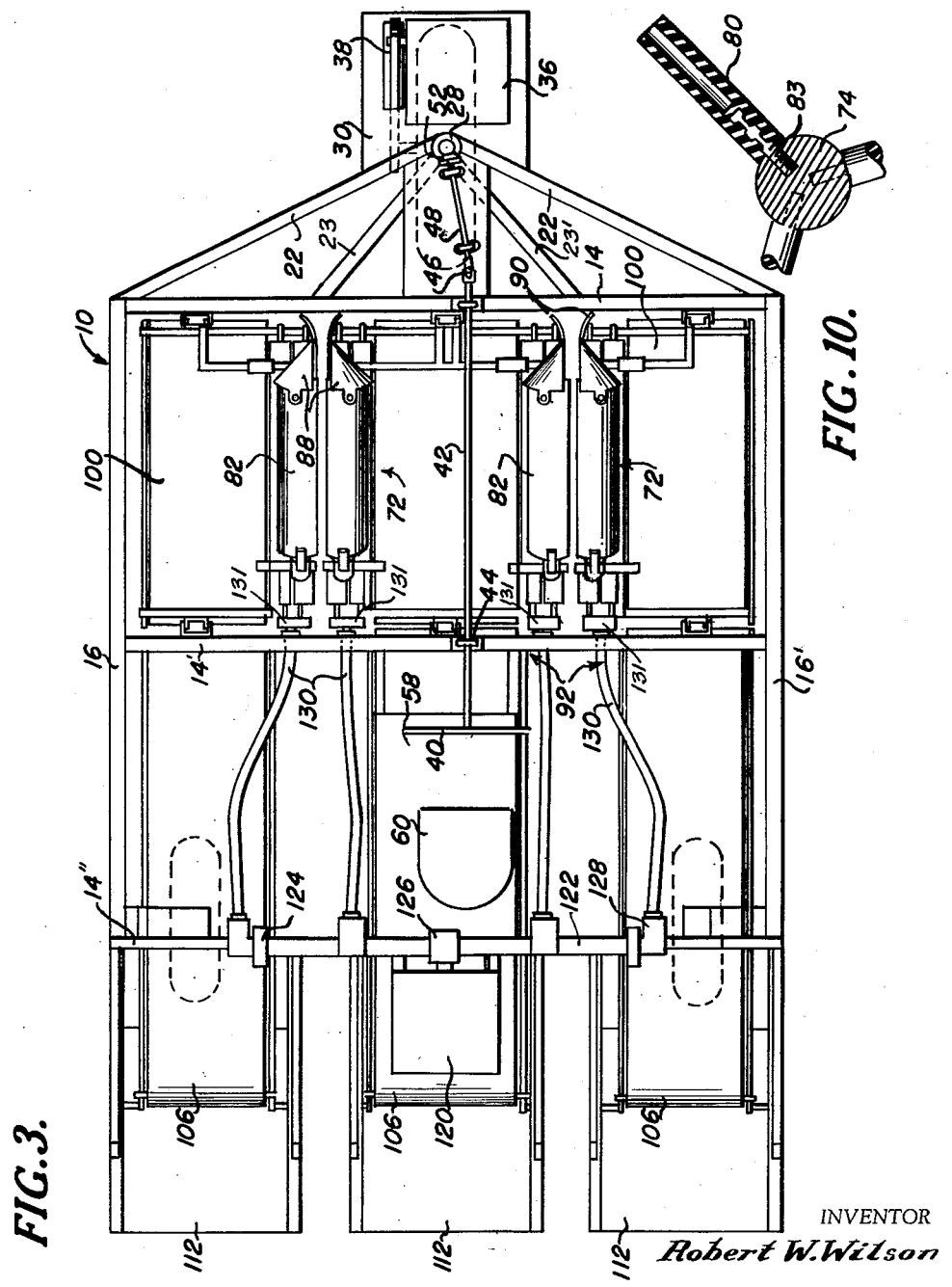
INVENTOR
*Robert W. Wilson*
BY
*Cushman, Darby & Cushman*
ATTORNEYS

United States Patent Office 2,816,411
Patented Dec. 17, 1957

2,816,411

TOBACCO PRIMING DEVICE

Robert W. Wilson, Raleigh, N. C.

Application July 21, 1954, Serial No. 444,813

16 Claims. (Cl. 56—27.5)

The present invention relates to tobacco harvesters and more particularly to a power-driven device for priming tobacco plants.

While tobacco constitutes one of the greatest gross income producing farm crops per acre, nevertheless, due to the great amount of manual labor required in producing tobacco, the net income per acre is often quite discouraging. The biggest single labor requirement in growing tobacco is the harvesting which is carried on at the present time only by hand. Certain of the other steps in growing tobacco such as transplanting, cultivating, topping and suckering have been mechanized to a high degree so as to substantially reduce the man hours per acre required to carry out these steps. However, due to the excessive labor required to harvest the tobacco, which occurs generally in only one or two months of the year, many farmers are discouraged to mechanize the steps mentioned above, preferring to utilize the laborers required for harvesting throughout the year.

While certain types of tobacco may be harvested by cutting down the entire stalk, the more expensive types are harvested by "priming" the individual leaves. A tobacco stalk of the latter type when fully matured often reaches a height of 6 feet or more and the leaves which are disposed spirally on the stalk, mature first at the bottom of the stalk. Consequently, it is necessary in harvesting such tobacco to remove the lower leaves in approximately a 12 inch vertical swath when they become matured, and then, subsequently, to remove additional swaths progressively higher up on the stalk as the remaining leaves mature. The leaves of the vertical swaths are at present removed by hand by grasping the topmost ripe leaf adjacent the stalk and with a downward motion removing those leaves below it. Weekly trips are usually made through the field harvesting a swath progressively higher on the stalk each time. This method of harvesting is well-known in the art as "priming" the tobacco plant.

The primary object of the present invention is to provide a power-driven device capable of priming tobacco plants so as to substantially reduce the man hours per acre required in the harvesting of tobacco to thereby largely overcome the difficulties mentioned above.

A further object of the invention is the provision of a tobacco plant priming device capable of delivering impact blows in a downward direction, a sideways direction, or a combination thereof to the tobacco leaves adjacent their connection to the tobacco stalk so as to remove a vertical swath of the leaves from the stalk.

A still further object of the invention is the provision of a power-driven tobacco leaf removing mechanism which will remove a vertical swath of leaves from a tobacco plant with minimum damage to the leaves.

Another object of the present invention is the provision of an inclined rotary power-driven tobacco leaf defoliating mechanism which will progressively remove a vertical swath of leaves from a tobacco stalk from the top to the bottom thereof.

A still further object of the present invention is the provision of a power-driven tobacco plant priming machine which is capable of vertical adjustment so that vertical swaths of tobacco leaves may be removed from progressively higher vertical positions on the tobacco stalk during successive passes through a tobacco field.

Still another object of the present invention is the provision of a tobacco harvesting machine which is adapted to straddle a tobacco plant row so as to prime the leaves of said row as it is moved therealong and to convey the primed leaves to an assembly point.

These and other objects of the present invention will become more apparent during the course of the following description and appended claims.

The invention may best be understood with reference to the accompanying drawings wherein illustrative embodiments are shown.

In the drawings:

Figure 1 is a side elevational view of a tobacco plant priming device embodying the principles of the present invention;

Figure 2 is a front elevational view of the device shown in Figure 1;

Figure 3 is a top plan;

Figure 4 is an enlarged elevational view showing one of the tobacco leaf removing mechanisms looking outwardly theretoward from the line of the tobacco row;

Figure 5 is a cross sectional view taken along the line 5—5 of Figure 4 showing the leaf removing mechanisms in operative relationship to a tobacco plant;

Figure 6 is a partial view on enlarged scale, showing the leaf striking elements of the leaf removing mechanism;

Figure 7 is a cross sectional view taken on the line 7—7 of Figure 6;

Figure 8 is a view similar to Figure 6, showing a modified form of the leaf removing mechanism;

Figure 9 is a cross sectional view taken on the line 9—9 of Figure 8; and

Figure 10 is an enlarged elevational view with parts broken away and shown in section illustrating one manner in which the striking elements may be mounted in the leaf removing mechanism.

Referring now more particularly to the drawings, there is shown in Figures 1 through 7 a preferred embodiment of the tobacco plant priming device of the present invention. The device includes a self-propelled vehicle generally designated 10 which preferably is constructed so as to straddle one or more rows of tobacco plants so that it can move along the tobacco plant row without damaging the tobacco plants. While it is preferred to employ a self-propelled vehicle particularly adapted for the purpose, it will be understood that the tobacco plant priming mechanism hereinafter to be described could readily be utilized as an attachment for conventional farm tractors. The self-propelled vehicle 10 comprises a frame 12 of any suitable construction and which, as shown, is composed of forward, intermediate, and rear of upper transverse frame members 14, 14', and 14" respectively connected together at their opposite ends by a pair of upper longitudinally extending frame members 16 and 16'. The upper frame members are disposed in a horizontal plane spaced above the ground a sufficient distance to substantially clear the top of a fully matured tobacco plant.

Extending downwardly from the rear transverse frame member 14" is a pair of vertically disposed wheel carrying frame members 18 having their upper ends rigidly secured to the rear frame member 14" and carrying on their lower ends, wheels 20. Extending forwardly from the forward transverse frame member 14 is a pair of forwardly converging horizontally disposed frame elements 22 and 22' rigidly fixed at their rear ends to opposite ends of the forward frame member 14 and having mounted on their forwardly converging ends the upper end of a tubular, vertically extending, steering column 24. A pair of forwardly and downwardly converging braces 23 and 23' have their rear ends rigidly connected to the intermediate portion of the frame member 14 in spaced relation and their forward ends fixed to the lower end of the steering column 24. Journaled within the steering column 24 is a steering shaft 26 having a bevelled gear 28 mounted on its upper end and a motor carrying platform 30 on its lower end. Extending downwardly from the platform 30 is a pair of wheel carrying arms 32 which are apertured at their lower ends to rotatably carry a front, steerable wheel 34. A suitable prime mover, schematically illustrated at 36, is preferably provided on the platform 30 with suitable drive means, such as belt 38, drivingly connecting the prime mover to the wheel 34 so as to provide the vehicle 10 with self-propulsion.

In order to steer the front wheel 34, a steering rod 42 having a steering wheel 40 mounted on its rear end is preferably journaled in suitable bearings 44 mounted on the transverse frame members 14 and has its forward end connected to the steering shaft 26 through a universal joint 46, an auxiliary shaft 48 journaled in bearings 50 and a bevelled gear 52 meshing with the bevelled gear 58 on the steering shaft 26.

The steering wheel 40 is disposed substantially in the mid portion of the frame adjacent an operator's station generally indicated at 54 which includes vertically extending frame members 56 fixed at their upper ends to the transverse frame members and carrying at their lower ends a platform 58 upon which the operator's feet may rest. A suitable seat 60 is mounted on the rear portion of the platform 58 if desired. It is to be understood that suitable controls (not shown) may be connected from the motor 36 to the operator's station 54 so as to position the same for convenient operation.

While the vehicle 10, as described above, is illustrated as a preferred embodiment, it will be readily understood that the exact structural details may be altered by those skilled in the art, bearing in mind that the essential condition is the provision of a vehicle frame which will straddle a row of tobacco plants so as to provide ample clearance above the tobacco plants to prevent damage. As is clearly illustrated in Figures 2 and 3 the vehicle 10 is adapted to straddle two adjacent tobacco plant rows and the rear wheels 20 are adapted to ride in the outer furrows with the single front steerable wheel 34 riding in the middle furrow.

As was stated above, the leaves of a tobacco plant extend outwardly from the stalk of the plant in a vertical spiral arrangement and consequently, in order to remove all of the leaves in a vertical swath along the tobacco plant stalk, it is essential that the leaf removing means approach the tobacco stalk around its entire periphery. In order to accomplish this purpose, it is necessary to provide leaf removing means on both sides of the tobacco plant if the leaves are to be removed by a single pass through the row.

For the purpose of mounting a leaf removing means which can approach tobacco plants from opposite sides and yet not include any rigid cross-connecting pieces, there is preferably provided a plurality of vertically extending supporting frames 62. Each of the supporting frames 62 preferably comprises forward and rearward downwardly extending channel members 64 which are adapted to extend over the furrows of the tobacco field. Each of the channel members 64 is secured at its upper end to a transverse frame member 14 and carries at its lower end a cooperating channel member 66. For the purpose of vertically adjusting the channel members 66 with respect to the channel members 64, the channel members 66 are provided with a plurality of longitudinally spaced apertures 67 and 67' respectively which may be selectively aligned to receive a suitable fastening such as bolts 68. The supporting frames 62 thus are capable of supporting a leaf removing means in a plurality of vertical positions so that a vertical swath of leaves may be removed from a tobacco plant progressively higher on the stalk during successive passes through the tobacco field. Moreover, by adjusting either the forward or rearward channel members with respect to the others, the inclination of the leaf removing means may be varied to thereby vary the vertical height of the swath to be removed.

The lower channel members 66 carry at their lower ends a plurality of transversely adjustable bars 70 upon which the leaf removing means hereinafter to be described is adapted to be mounted. It is to be noted that the adjustable bars 70 extend inwardly toward their adjacent tobacco plants, but may be adjusted so as to provide for the free passage of the tobacco stalks at varying transverse positions therebetween. While the adjustment of the position of the leaf removing means is shown as being accomplished by manually adjustable members, it is to be understood that other means may be employed and that power means, such as hydraulic rams and the like, may be utilized if desired.

The leaf removing means preferably embodies a dual leaf defoliating mechanism generally indicated 72 disposed so as to rotate in cooperating relation on opposite sides of the tobacco stalk. Each rotary component of the leaf defoliating mechanism 72 comprises an upwardly and forwardly extending shaft 74 journaled in bearings 76 carried by adjustable transverse extensions 78 of the bars 70. The shaft 74 is provided with a plurality of transversely extending striking elements 80 which are preferably made of a resilient material, such as rubber, plastic or the like. The transverse striking elements 80 are preferably longitudinally spaced along the shaft 74 and spirally arranged thereon as can best be seen in Figure 4. The shaft 74 also carries a plurality of longitudinal striking elements 82 which also are made of a resilient material such as rubber, plastic or the like. As can best be seen from Figure 10, the striking elements 80 are preferably tubular in form and are attached to the shaft 74 by any suitable means, such as lugs 83 threadedly engaged in the shaft 74 and embedded in the striking elements.

Encircling the outer portion of each component or unit of the defoliating mechanism 72 is a semi-circular guard 84 having attaching brackets 86 extending from opposite ends thereof which are secured to the upper portion of the bars 76 respectively. Carried by the forward end of each guard 84 is a stalk deflecting member 88 having a guide rod 90 extending forwardly therefrom.

For the purpose of conveying away the leaves removed by the defoliating mechanisms there is provided below each of the defoliating mechanisms a conveyor means generally indicated 92. Each of the conveyor means 92 comprises a pair of roller conveyors 98 mounted between the channel members 66 by means of extensions 96 on bars 94 extending transversely from each of the forward and rearward channel members. The rollers 98 are adapted to receive the leaves as they are removed from the stalk by the defoliating mechanisms and convey the same onto a belt conveyor 100. The belt conveyor 100 is of conventional construction and includes rollers 102 rotatable in conveyor frame 104 mounted between the bars 94. The belt conveyor 100 is adapted to convey the removed leaves from the rollers 98 rearwardly to a second belt conveyor 106 which is also of a conventional structure including rollers 108 rotatably carried by a conveyor frame 110. The belt conveyor 106 extends upwardly and rearwardly and is adapted to convey the removed leaves from the conveyor 100 into a collection station or collecting bin 112.

In order to permit the lower end of the conveyor 106 to be vertically adjusted in accordance with the vertical position of the conveyor 100, the conveyor frame 110 is secured to the frame members 18 by a brace member 114 adjustably mounted between the frame members 18 and conveyor frames 110. The rear end of the conveyor frames 110 are adjustably secured to the frame members 18 by means of rearwardly extending horizontal frame members 116 which also serve to support the collecting bins 112. Braces 118 are provided between the frame members 18 and rear end of the frame members 116 to add strength thereto, if desired.

For the purpose of driving the defoliating mechanisms, the conveying rollers and the belt conveyors there is provided a second prime mover which is shown schematically at 120. A main driving shaft 122 is journalled on the rear transverse frame member 14 by means of suitable bearings 124 and is connected to the prime mover 120 through gear box 126. Disposed along the shaft 122 are a series of output gear boxes 128 having connected therewith a plurality of flexible shafts 130 connected respectively to the conveyors 98, 100, 106 and defoliating mechanism shafts 74 by any suitable means, such as multiple output gear boxes 131, schematically illustrated in Figure 3, and flexible shafts connecting the output shafts of the gear boxes to the respective driven instrumentalities. While the particular driving means for the conveyors and the defoliating mechanisms are illustrated as preferably comprising flexible shafts driven from output gear boxes connected with a main driving shaft, it will be understood that other means may be employed to accomplish this end.

In Figures 8 and 9 there is shown a modified form of the defoliating mechanisms 72. In this embodiment, the guard 84 may be dispensed with and a tubular member 132 is provided to perform the function of the guard. The tubular member 132 is mounted to rotate about an axis spaced inwardly from the axis of the shaft 74 and includes a plurality of slots 134 through which the transverse striking elements 80 on the shaft 74 are adapted to extend. The tubular member 132 has spaced along its outer periphery a plurality of broken longitudinal striking elements 136 similar to the longitudinal striking elements 82 described above.

*Operation*

As was stated above, the lower leaves of a tobacco plant ripen before the upper leaves and consequently, in order to harvest the leaves at the time they mature the tobacco plants are primed by first removing a bottom vertical swath of ripened leaves and after the above leaves have matured, a second vertical swath of leaves is removed and this priming procedure is continued until substantially all of the leaves of the tobacco plant have been harvested. Due to the manner in which the tobacco leaves are connected to the stalk and their disposition along the stalk, it has been found necessary to provide a mechanism which will deliver an impact blow or which will strike each of the tobacco leaves in the vertical swath adjacent its connection to the stalk.

Accordingly, with the above in mind, the tobacco priming device of the present invention operates as follows. The self-propelled vehicle 10 is brought into position in the tobacco field with the wheels directed in the furrows, and the tobacco plant rows positioned so as to pass between the defoliating mechanisms 72. In making an initial pass through a tobacco row the channel members 64 and 66 are adjusted to their lowermost vertical position so that the defoliating mechanism will remove a vertical swath of leaves from the very bottom portion of the tobacco stalks. The motor 36 is then operated to move the vehicle forwardly until the first tobacco stalk of the row is contacted by the guide elements 90 and directed thereby in between the defoliating mechanisms 72. Due to the upward and forward inclination of the defoliating mechanisms the upper leaves of the swath are first removed by engagement of the forward striking elements therewith.

As can be clearly seen from Figure 5, the transverse striking elements 80 extend outwardly from the shaft 74 sufficiently to engage any leaves of the swath which are attached to the stem so as to extend in the direction of the row. The defoliating mechanisms 72 on opposite sides of the tobacco plant are adapted to be rotated by the motor 120 in opposite directions so as to cause the transverse striking elements 80 to deliver a downward impact blow to the longitudinally extending leaves adjacent their connection to the stalk. Likewise, the longitudinal striking elements 82 are adapted to deliver a similar downward impact blow to the leaves of the swath which extend outwardly transversely of the row. During the removing of the leaves by the defoliating mechanisms 72 the guards 84 serve as a convenient means to prevent the removed leaves from becoming entangled in the striking elements and also as a means to protect the leaves above the swath from being engaged by the striking elements. As the vehicle progresses forwardly, all of the leaves in the vertical swath are removed from the stalk either by the transverse striking elements or the longitudinal striking elements progressing from top to bottom. The vehicle 10 proceeds down the tobacco plant row to prime the next plant in a similar manner and so forth. As the leaves of the swath are removed by the defoliating mechanism the removed leaves will fall onto the rollers 98 from where they are conveyed laterally onto the belt conveyors 100. The belt conveyors 100 carry the removed leaves rearwardly onto the conveyor 106 from where they are conveyed into the collection bins 112.

The defoliating mechanisms shown in Figures 8 and 9 operate in a manner similar to that described in connection with the defoliating mechanisms of Figures 1 through 7. However, in this embodiment the tubular members 132 function as a guard to prevent the leaves from becoming entangled in the striking elements 80. Due to their offset axis of rotation, the outer peripheries of the tubular members 132 are displaced from the shafts 74 a greater distance outwardly of the tobacco stalk than inwardly thereof, and consequently, as shown in Figure 9, the transverse striking elements 80 will extend outwardly from the peripheries of the tubular members 132 when the striking elements are in a leaf engaging or striking position. Likewise, the longitudinal striking elements 136 will be disposed inwardly from the outer ends of the striking elements 80 in their leaf engaging position. It is believed apparent that during the rotation of the shafts 74 the projections 80 will carry with them the tubular members 132 and after the striking elements 80 and 136 have delivered a downward impact blow to the tobacco leaves, they will rotate onto a position wherein the peripheries of the tubular members 132 extend substantially to the outer end of the transverse striking element 80. In this manner the tubular members 132 will serve as a means for guarding the striking elements 80 and also as a means for carrying the longitudinal striking elements 136.

From the above it can be seen that there has been provided a tobacco harvesting machine which is capable of self-propulsion along a tobacco plant row in straddled relationship thereto. The harvesting machine carries leaf defoliating mechanisms which are capable of priming the tobacco plants by removing a vertical swath of leaves from the tobacco plant stalk and conveying the removed leaves to a suitable collection station mounted on the vehicle. The defoliating mechanisms are constructed and arranged so as to operate in cooperating relationship on opposite sides of the tobacco plants to strike each leaf of the vertical swath with a downward impact blow adjacent each leaf's connection to the stalk. The leaf defoliating mechanisms are also arranged to guide the tobacco stalks therebetween and includes means for guarding the leaves against damage during their removal. The leaf defoliating mechanisms are vertically adjustable so that the vertical swath may be removed progressively higher on the tobacco stalk. It is believed apparent that the tobacco priming machine of the present invention is capable of harvesting tobacco leaves with a saving of man hours per acre over the manual methods now employed.

The essential condition in relation to the structure described to remove the vertical swath of leaves is that the mechanism will deliver an impact blow to each leaf adjacent its connection to the stalk.

It is to be understood, however, that the form of the invention herewith shown and described is to be taken as the preferred embodiment of the same and that various changes may be made without departing from the spirit of the invention or the scope of the appended claims.

I claim:

1. A tobacco plant priming device comprising a vehicle frame movable along a row of tobacco plants, a pair of inclined members, means between said members and said frame for rotatably mounting said members on said frame in spaced parallel relation for passage on opposite sides of said tobacco plants, each of said members including means for removing a vertical swatch of tobacco leaves from each tobacco plant as the frame is moved along the row by downwardly striking each leaf of said swath adjacent its connection to the tobacco plant stalk as said members are rotated, and means operatively associated with said members for rotating the same in opposite directions.

2. A tobacco plant priming device as defined in claim 1 wherein said leaf removing means includes longitudinal and transverse elements disposed along each of said pair of members.

3. A tobacco plant priming device as defined in claim 2 wherein said transverse elements extend radially outwardly from said members.

4. A tobacco plant priming device as defined in claim 2 wherein said longitudinal elements are secured to the periphery of said members.

5. A tobacco plant priming device as defined in claim 2 wherein said longitudinal elements are mounted for rotary movement with each of said members about an axis offset from the axis of each of said members.

6. A tobacco plant priming device comprising a movable frame, a pair of upwardly and forwardly extending shafts, means between said members and said frame for mounting said shafts on said frame in spaced parallel relation so as to receive a tobacco plant therebetween, each of said shafts having a plurality of transversely extending tobacco leaf striking elements spaced longitudinally thereon and a longitudinal tobacco leaf striking element operatively associated therewith, and means operatively associated with said shafts for rotating the same to cause said striking elements to remove a vertical swath of leaves from a tobacco plant disposed between said shafts by striking each of said leaves downwardly adjacent its connection to the tobacco plant stalk as said frame is moved forwardly.

7. A tobacco plant priming device as defined in claim 6 including tobacco leaf guard means adjacent said striking elements.

8. A tobacco plant priming device as defined in claim 6 wherein means are provided adjacent the forward portion of said shafts for guiding said tobacco plant stalks between said shafts.

9. In a tobacco plant priming device for removing a vertical swath of tobacco leaves from a tobacco plant stalk, an upwardly and forwardly extending elongated member, transversely extending striking means spaced longitudinally along said member, and longitudinally extending striking means disposed inwardly from the outer ends of said transverse striking means, said striking means being adapted to be driven so as to deliver an impact blow to the leaves of said swath adjacent their connection to said tobacco stalk.

10. A tobacco plant priming device as defined in claim 9, wherein said striking means comprise resilient elements.

11. A tobacco plant priming device as defined in claim 9, including guard means for preventing tobacco leaves from becoming entangled in said transversely extending striking means.

12. A tobacco plant leaf removing device comprising a mobile frame, a pair of closely spaced impact means on said frame, means operatively connected to at least one of said impact means for rapidly moving said impact means in a generally downward path as said frame is moved alongside the tobacco plant, whereby to strike and remove substantially all of the leaves from said plant within the path of movement of said impact means.

13. The device as defined in claim 12 wherein said one impact means is upwardly and forwardly inclined so as to progressively strike and remove the leaves engaged thereby from top to bottom.

14. The device as defined in claim 12 including means operatively associated with said frame for vertically adjusting said one impact means whereby the leaves may be removed at preselected levels relative to the ground within a vertical swatch which may be varied to conform to the height of the ripe leaves.

15. The device as defined in claim 12 wherein said frame is provided with means disposed below said one impact means for conveying the removed leaves to a collection station.

16. Apparatus for priming tobacco plants having stalks and leaves extending outwardly therefrom comprising a mobile frame for movement along a row of such plants, a pair of closely spaced means carried by said frame for engaging the plants adjacent their stalks on opposite sides thereof as the frame is moved therealong, at least one of said means comprising driven impact means for delivering to substantially all the leaves engaged thereby a downward impact blow adjacent the connection of the leaves with their stalks, and means operatively associated with said driven impact means for rapidly moving the latter in a generally downward path as said frame is moved along the row of plants.

References Cited in the file of this patent

UNITED STATES PATENTS

| | | |
|---|---|---|
| 2,475,531 | Townsend | July 5, 1949 |
| 2,677,227 | Caldwell | May 4, 1954 |
| 2,692,467 | Bigler | Oct. 26, 1954 |
| 2,696,069 | Hawkins | Dec. 7, 1954 |